(12) United States Patent
Sasmal et al.

(10) Patent No.: US 10,761,549 B2
(45) Date of Patent: Sep. 1, 2020

(54) VOLTAGE SENSING MECHANISM TO MINIMIZE SHORT-TO-GROUND CURRENT FOR LOW DROP-OUT AND BYPASS MODE REGULATORS

(71) Applicant: Microsemi Corporation, Aliso Viejo, CA (US)

(72) Inventors: Subhasis Sasmal, Howrah (IN); Jebas Paul Daniel T, Tirunelveli (IN); Naveen Cannankurichi, Hyderabad (IN); Bernard Drexler, Gieres (FR)

(73) Assignee: Microsemi Corporation, Chandler, AZ (US)

(*) Notice: Subject to any disclaimer, the term of this patent is extended or adjusted under 35 U.S.C. 154(b) by 0 days.

(21) Appl. No.: 15/867,335

(22) Filed: Jan. 10, 2018

(65) Prior Publication Data
US 2018/0196453 A1 Jul. 12, 2018

(30) Foreign Application Priority Data

Jan. 12, 2017 (IN) .............................. 201721001359

(51) Int. Cl.
*G05F 1/569* (2006.01)
*G05F 1/575* (2006.01)
(Continued)

(52) U.S. Cl.
CPC .............. *G05F 1/569* (2013.01); *G05F 1/445* (2013.01); *G05F 1/575* (2013.01); *G05F 3/24* (2013.01); *H02M 3/156* (2013.01)

(58) Field of Classification Search
CPC . G05F 1/445; G05F 1/46; G05F 1/461; G05F 1/462; G05F 1/467; G05F 1/468; G05F 1/56; G05F 1/562; G05F 1/565; G05F 1/569; G05F 1/571; G05F 1/573; G05F 1/5735; G05F 1/575; G05F 3/20; G05F 3/22; G05F 3/24; G05F 3/242; G05F 3/247; G05F 3/227; G05F 1/61; H02M 3/156; H02M 3/158; H02M 3/1588; H02M 3/1584; H02M 2001/0009; H02M 2001/0025; H02M 2001/0029; H02M 2001/0032; H02M 2001/0038; H02M 2001/0045;
(Continued)

(56) References Cited

U.S. PATENT DOCUMENTS 6,087,877 A * 7/2000 Gonda ............... H03K 17/0822
  327/110
6,501,253 B2 * 12/2002 Marty ..................... G05F 1/565
  323/274

(Continued)

*Primary Examiner* — Thienvu V Tran
*Assistant Examiner* — Carlos O Rivera-Perez
(74) *Attorney, Agent, or Firm* — Glass and Associates; Kenneth Glass

(57) ABSTRACT

Various electronics systems may benefit from appropriate limitation of short-to-ground current. For example, sensor systems may benefit from a voltage sensing mechanism to minimize short-to-ground current for low drop-out and bypass mode regulators. A system can include a first power transistor configured to operate in a low drop-out mode. The system can also include a short to ground sensor configured to control current to the first power transistor. The short to ground sensor can be configured to limit a maximum short-circuit current below a predefined load current capability.

18 Claims, 10 Drawing Sheets

(51) Int. Cl.
*H02M 3/156* (2006.01)
*G05F 3/24* (2006.01)
*G05F 1/445* (2006.01)

(58) Field of Classification Search
CPC .......... H02M 1/32; H02M 1/325; H02M 1/34; H02M 1/36; H02M 2003/1566; H02M 3/157
USPC ........ 323/222–226, 266, 268–278, 282–285, 323/289, 299, 311, 312, 351, 901, 908; 363/49, 50, 56.03, 56.04, 56.12; 361/18, 361/42, 78, 86, 88, 91.1, 93.1, 93.9; 327/309–332
See application file for complete search history.

(56) References Cited

U.S. PATENT DOCUMENTS

| | | | |
|---|---|---|---|
| 8,482,894 B2 | 7/2013 | Yra et al. | |
| 2008/0169706 A1* | 7/2008 | Onishi | H02J 7/025 307/104 |
| 2011/0235222 A1* | 9/2011 | Hong | G05F 1/573 361/42 |
| 2015/0188421 A1* | 7/2015 | Ko | H02M 3/156 323/282 |
| 2016/0043539 A1* | 2/2016 | Mallala | G05F 1/573 361/18 |
| 2016/0268897 A1* | 9/2016 | Pan | G11C 16/30 |

* cited by examiner

US 10,761,549 B2

VOLTAGE SENSING MECHANISM TO MINIMIZE SHORT-TO-GROUND CURRENT FOR LOW DROP-OUT AND BYPASS MODE REGULATORS

CROSS-REFERENCE TO RELATED APPLICATIONS

This application claims priority to India Patent Application No. 201721001359 filed Jan. 12, 2017, the entirety of which is hereby incorporated herein by reference.

BACKGROUND

Field

Various electronics systems may benefit from appropriate limitation of short-to-ground current. For example, sensor systems may benefit from a voltage sensing mechanism to minimize short-to-ground current for low drop-out and bypass mode regulators.

Description of the Related Art

A conventional current-sensing mechanism can limit maximum short-current to about 3-4 times load current capability. This high limit can cause high power dissipation for a higher input supply voltage and higher drop-out across a pass-device. Lowering the current-limit value can degrade stability of the control-loop severely. Also, these schemes cannot be re-used to protect the pass-device during a short in a bypass mode and hence require a separate digital control for controlling the bypass mode.

In general, the comparison threshold current is kept 3 to 4 times more than the maximum load current to ensure that the control loop using the conventional current-sensing mechanism does not interfere with regulator loop stability in normal operation. In addition, in a conventional approach a separate digital control scheme is required to protect the pass-device during a short in a bypass mode. Bypass mode can refer to a mode in which the source is viewed as sufficiently regulated and additional regulation circuitry can be bypassed, so that the source is applied directly or nearly directly to the load. This is in contrast to other modes, like a "start-up mode" or a "low dropout mode" (other modes are also possible) where the source may need additional regulation.

SUMMARY

According to certain embodiments of the present invention, an apparatus can include a first power transistor configured to operate in a low drop-out mode. The apparatus can also include a short to ground sensor configured to control current to the first power transistor. The short to ground sensor can be configured to limit a maximum short-circuit current below a predefined load current capability.

In certain embodiments of the present invention, a method can include operating a first power transistor in a low drop-out mode. The method can also include controlling, with a short to ground sensor, current to the first power transistor. The controlling can limit a maximum short-circuit current below a predefined load current capability.

An apparatus, according to certain embodiments of the present invention, can include means for operating a first power transistor in a low drop-out mode. The apparatus can also include means for controlling current to the first power transistor. The means for controlling can limit a maximum short-circuit current below a predefined load current capability.

BRIEF DESCRIPTION OF THE DRAWINGS

For proper understanding of the invention, reference should be made to the accompanying drawings, wherein.

DETAILED DESCRIPTION

Certain embodiments of the present invention can limit short circuit current both in a low regulation mode, also known as a low drop-out (LDO) mode, and in a bypass mode. Additionally, certain embodiments of the present invention can permit a short circuit current to be less than a load current without impacting loop stability. In addition the same or similar schemes can limit short circuit current during a bypass mode.

Figure 1:
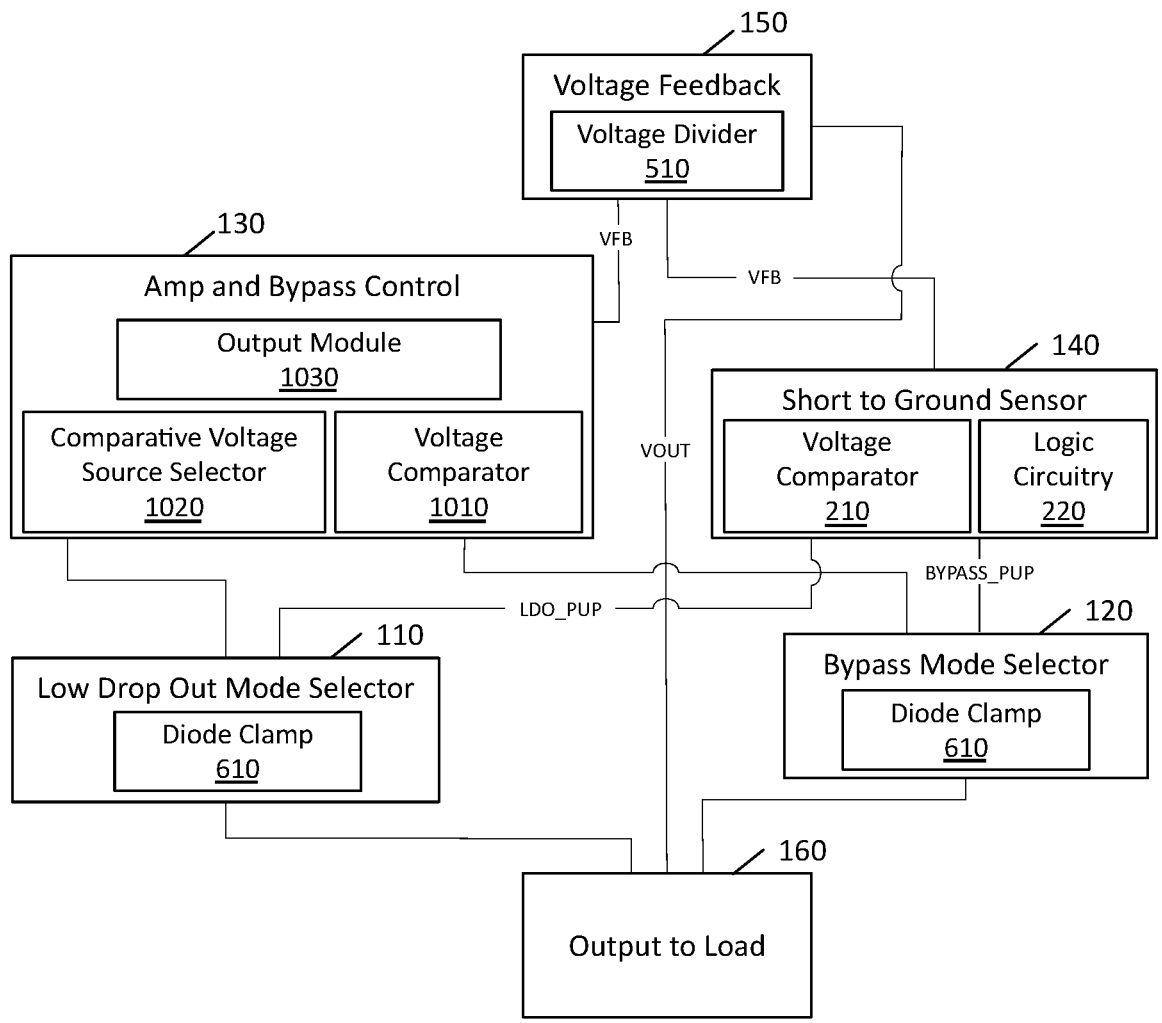
FIG. 1 illustrates a high level representation of a first exemplary voltage sensing scheme according to certain embodiments of the present invention.

FIG. 1 illustrates a high level representation of a first exemplary voltage sensing scheme or system according to certain embodiments of the present invention. As shown in FIG. 1, a voltage sensing system can be composed of multiple functional blocks, including a low drop out mode selector 110 and a bypass mode selector 120. The low drop out mode selector 110 and bypass mode selector 120 can be controlled by an amp and bypass control module 130, as well as by a short to ground sensor 140. The amp and bypass control module 130 and the short to ground sensor 140 can receive a feedback voltage, VFB, from a voltage feedback block 150. The output to load 160 can provide VOUT, controlled by the low drop out mode selector 110 and the bypass mode selector 120, and sensed by the voltage feedback block 150. The short to ground sensor 140 can control the low drop out mode selector 110 using the logical signal LDO_PUP. Moreover, the short to ground sensor 140 can control the bypass mode selector 120 using logical signal BYPASS_PUP.

Figure 2:
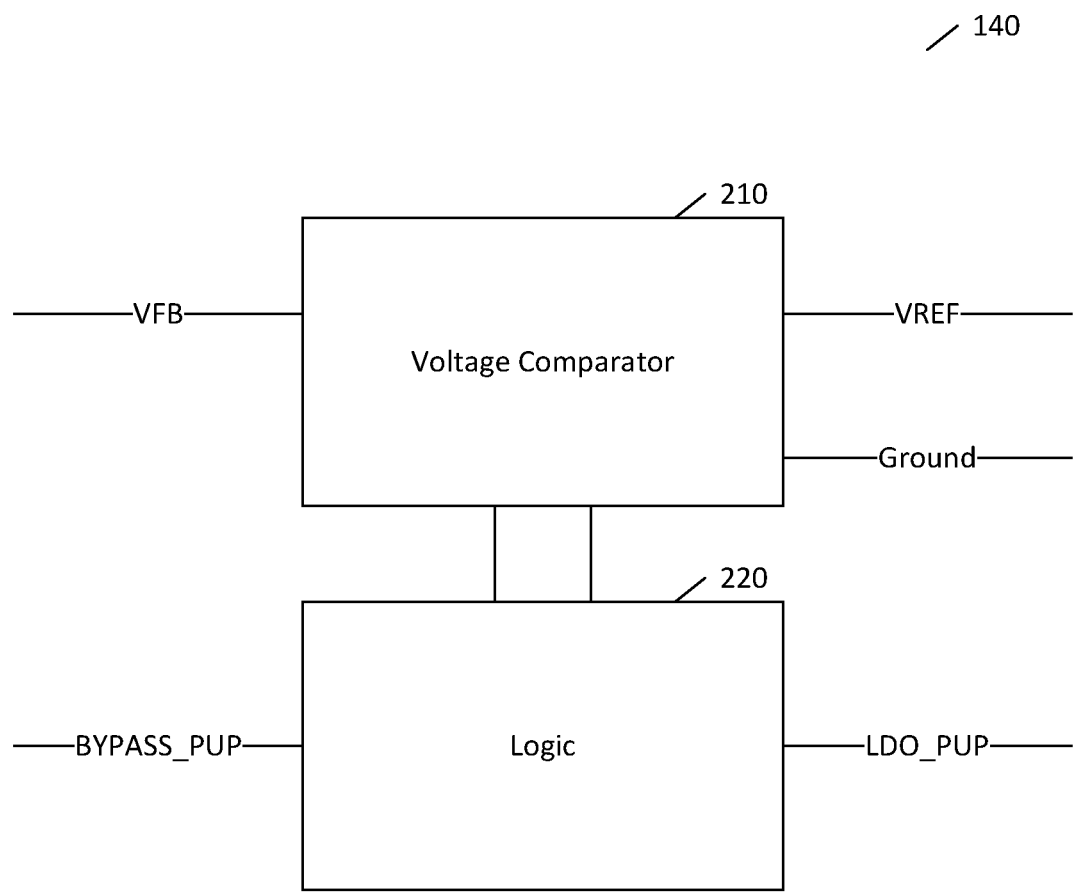
FIG. 2 illustrates a functional block diagram of a first exemplary short to ground sensor according to certain embodiments of the present invention.

FIG. 2 illustrates a functional block diagram of a first exemplary short to ground sensor according to certain embodiments of the present invention. As shown in FIG. 2, a short to ground sensor 140 can include a voltage comparator 210 and logic circuitry 220. The voltage comparator 210 can receive feedback voltage VFB and can compare it to a reference voltage VREF. The voltage comparator 210 can also be provided with a reference ground. The voltage comparator 210 can also be interfaced with one or more interfaces to logic circuitry 220. The logic circuitry 220 can supply output control signals, BYPASS_PUP and LDO_PUP, which can be used as described above with reference to FIG. 1.

Figure 3:
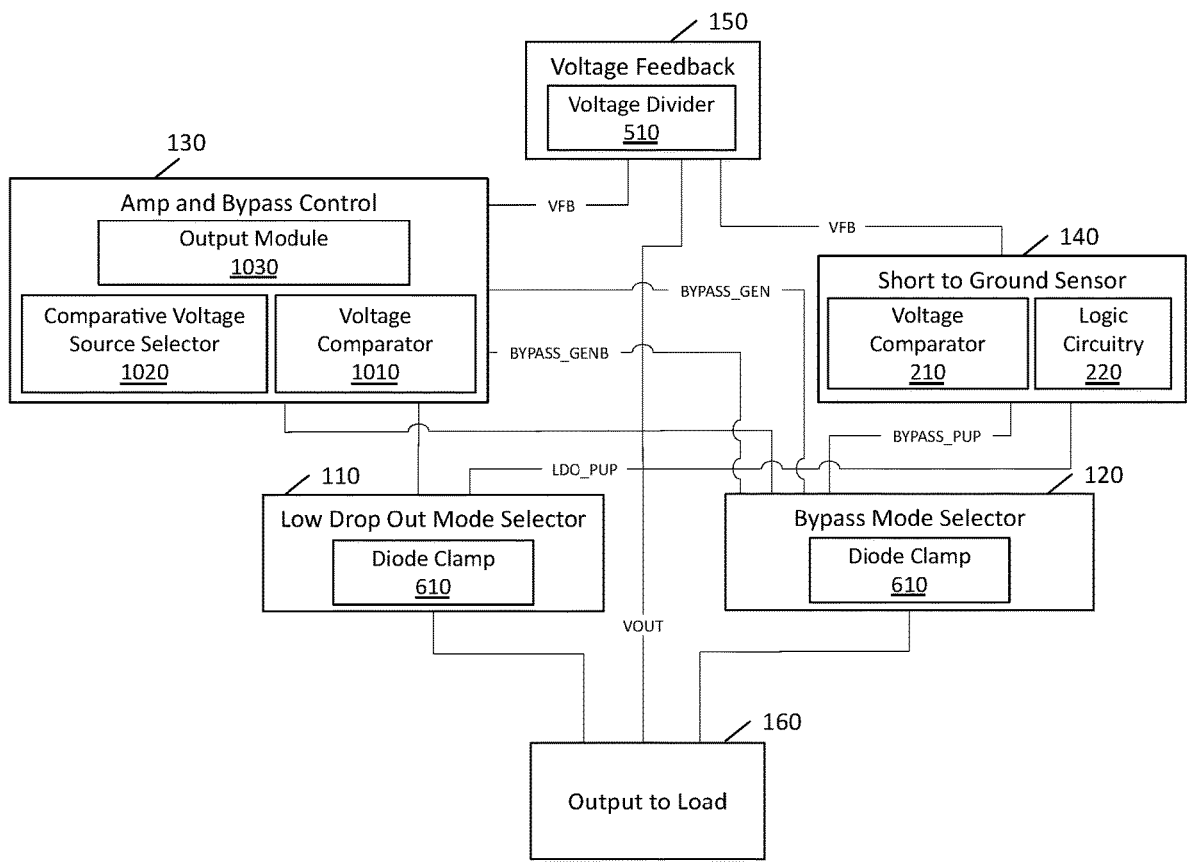
FIG. 3 illustrates a high level representation of a second exemplary voltage sensing scheme according to certain embodiments of the present invention.

FIG. 3 illustrates a high level representation of a second exemplary voltage sensing scheme according to certain embodiments of the present invention. The second example is similar to the first example, illustrated in FIG. 1, except that in this case, the amp and bypass control module 130 further provides some control of the bypass mode selector 120, using the logical signals BYPASS_GEN and BYPASS_GENB. Furthermore, the bypass mode selector 120 can receive logical signal BYPASS_PUP from short to ground sensor 140.

Figure 4:
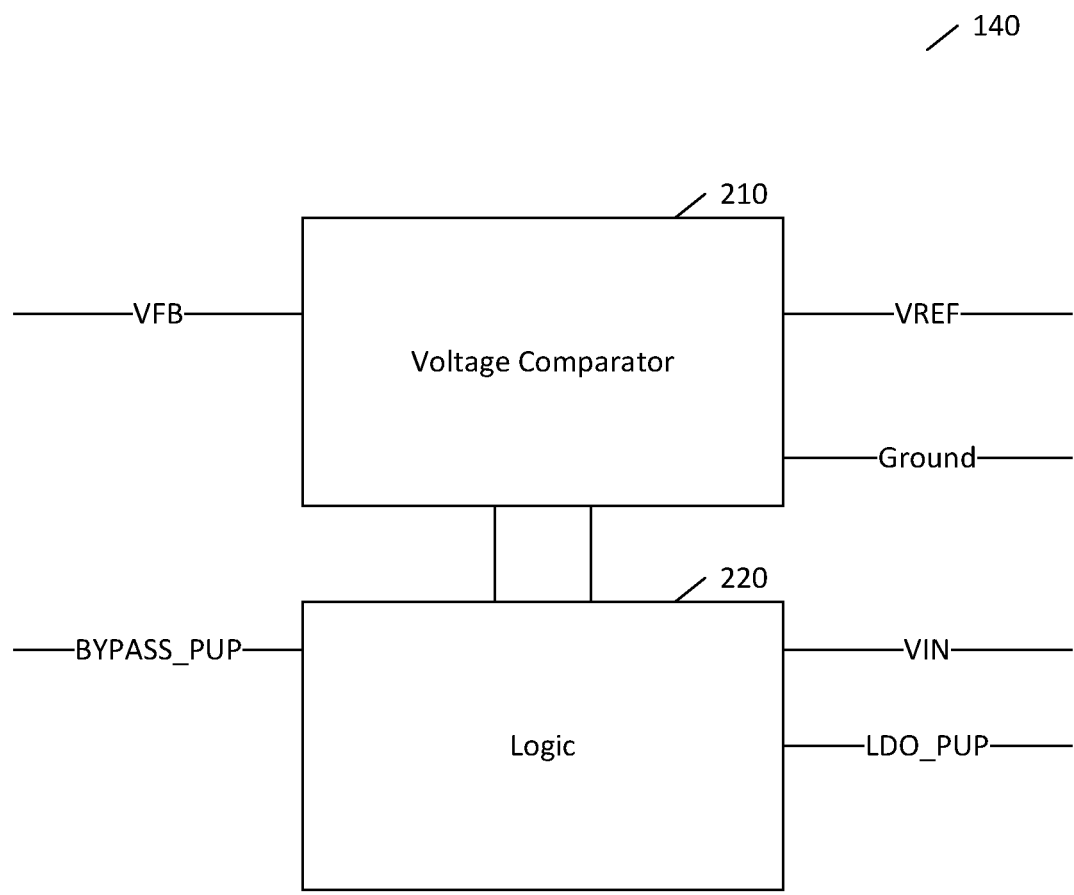
FIG. 4 illustrates a functional block diagram of a second exemplary short to ground sensor according to certain embodiments of the present invention.

FIG. 4 illustrates a functional block diagram of a second exemplary short to ground sensor according to certain embodiments of the present invention. The second example is similar to the first example, illustrated in FIG. 2, except that in this case, the logic circuitry 220 is provided with input voltage VIN.

Figure 5:
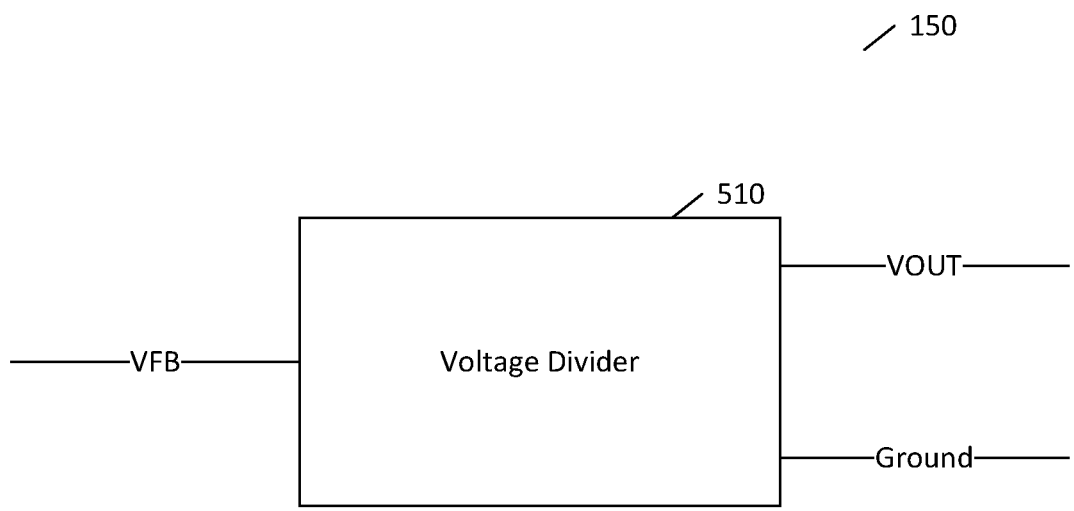
FIG. 5 illustrates a voltage feedback module according to certain embodiments of the present invention.

FIG. 5 illustrates a voltage feedback module according to certain embodiments of the present invention. This module is an example of voltage feedback block 150, as also shown in FIGS. 1 and 3. The module can include a voltage divider 510 that connects between output voltage VOUT and ground. The voltage divider 510 can output the feedback voltage, VFB. The voltage divider 510 may be implemented in any desired way, such as a pair of series connected resistors.

Figure 6:
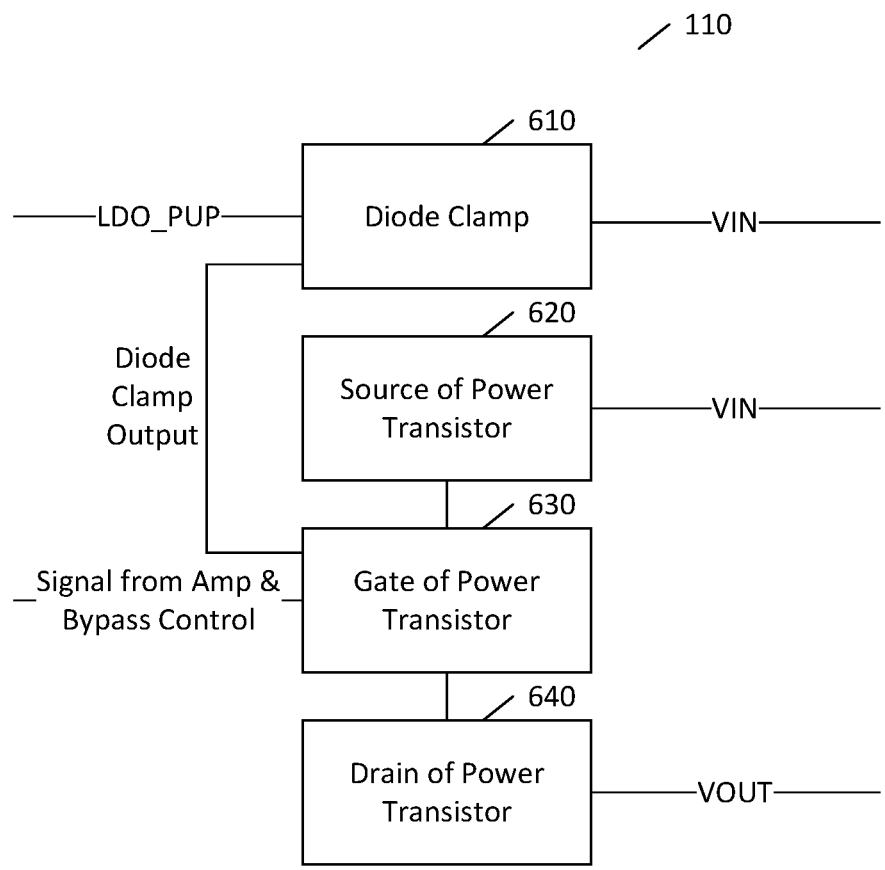
FIG. 6 illustrates a low drop out mode selector according to certain embodiments of the present invention.

FIG. 6 illustrates a low drop out mode selector according to certain embodiments of the present invention. The low drop out mode selector 110 can include a diode clamp 610. The diode clamp 610 can clamp current from voltage input VIN and can be controlled by logical signal LDO_PUP, as described above. An output of the diode clamp 610 can, together with a signal from amp and bypass control 130, control the gate 630 of a power transistor. The gate 630 can control flow of current from the source 620 of the power transistor to the drain 640 of the power transistor. The source 620 can be connected to input voltage VIN. The drain 640 can provide output voltage VOUT.

Figure 7:
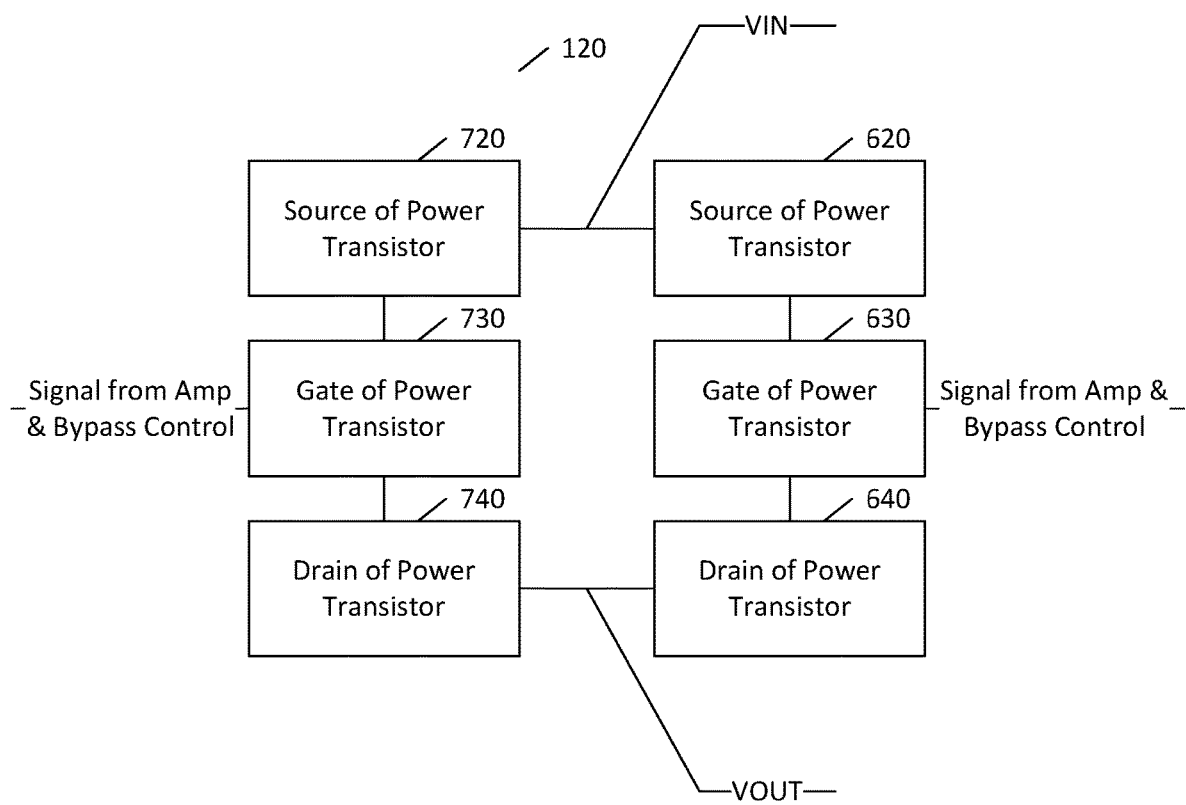
FIG. 7 illustrates a first exemplary bypass mode selector according to certain embodiments of the present invention.

FIG. 7 illustrates a first exemplary bypass mode selector according to certain embodiments of the present invention. As shown in FIG. 7, a signal from amp & bypass control 130 can also be applied to the gate 730. The gate 730 can control flow of current from the source 720 of the power transistor to the drain 740 of the power transistor. The source 720 can be connected to the input voltage VIN, and the drain 740 can supply output voltage VOUT. As further illustrated in FIG. 7, the power transistor of bypass mode selector 120 can be connected in parallel with the power transistor of low drop out mode selector 110. In bypass mode, current can flow through both power transistors in parallel.

Figure 8:
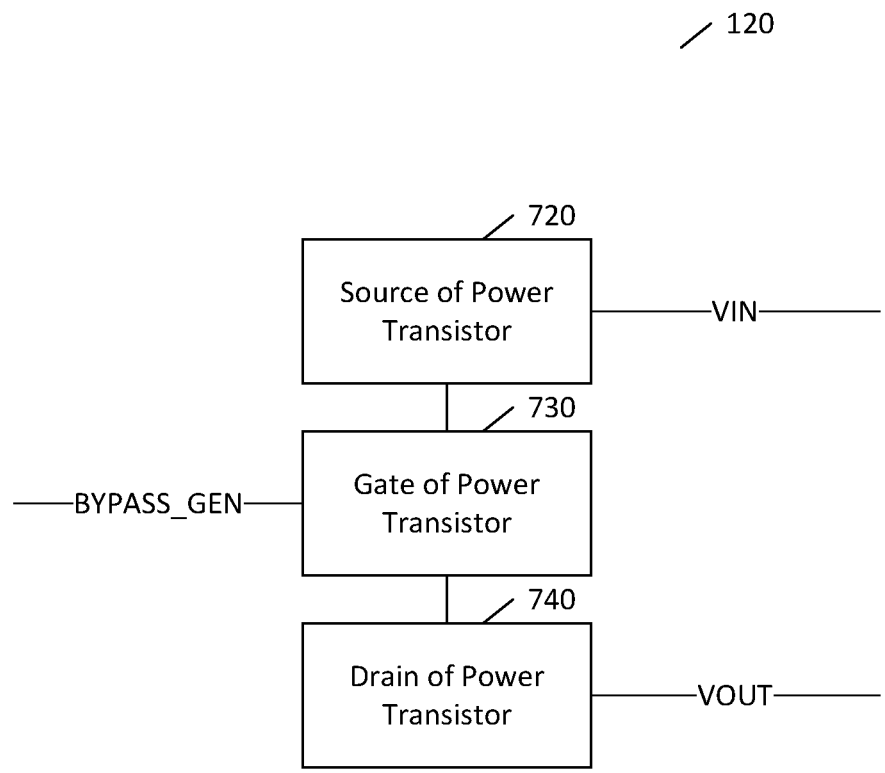
FIG. 8 illustrates a second exemplary bypass mode selector according to certain embodiments of the present invention.

FIG. 8 illustrates a second exemplary bypass mode selector according to certain embodiments of the present invention. In this example, the gate 730 of the power transistor can be controlled by logical signal BYPASS_GEN. Otherwise, however, the power transistor may function in a similar way, with the source 720 coupled to voltage VIN and the drain 740 outputting voltage VOUT. Although not shown, the power transistor of low drop out mode selector 110 can be connected in parallel, as show in FIG. 7.

Figure 9:
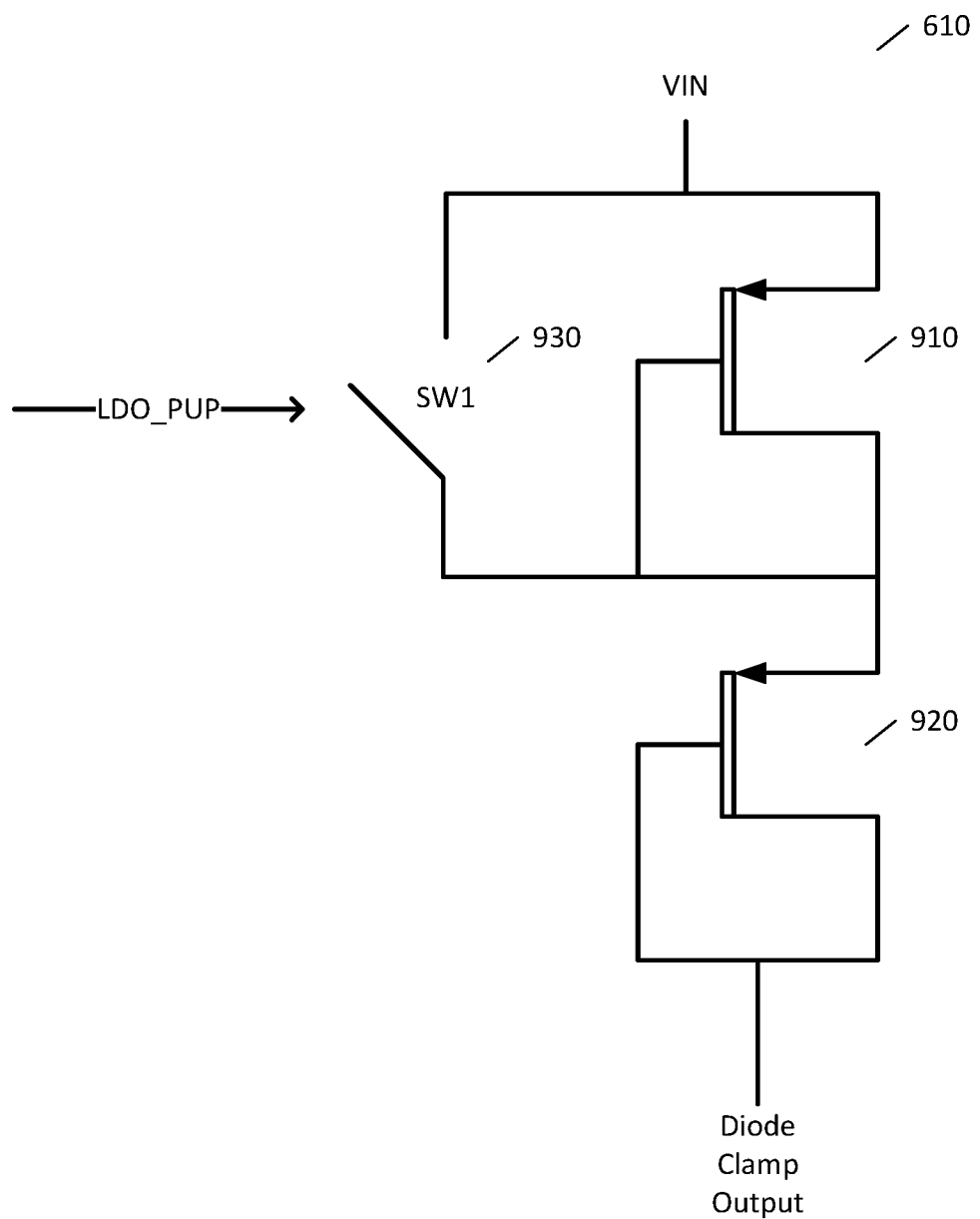
FIG. 9 illustrates a diode clamp according to certain embodiments of the present invention.

FIG. 9 illustrates a diode clamp according to certain embodiments of the present invention. As shown in FIG. 9, diode clamp 610 can include a first power transistor 910 and a second power transistor 920. The first power transistor 910 can be selectively bypassed by switch 930, designated as switch 1 (SW1). Switch 930 can be controlled by logical signal LDO_PUP, as described above.

Figure 10:
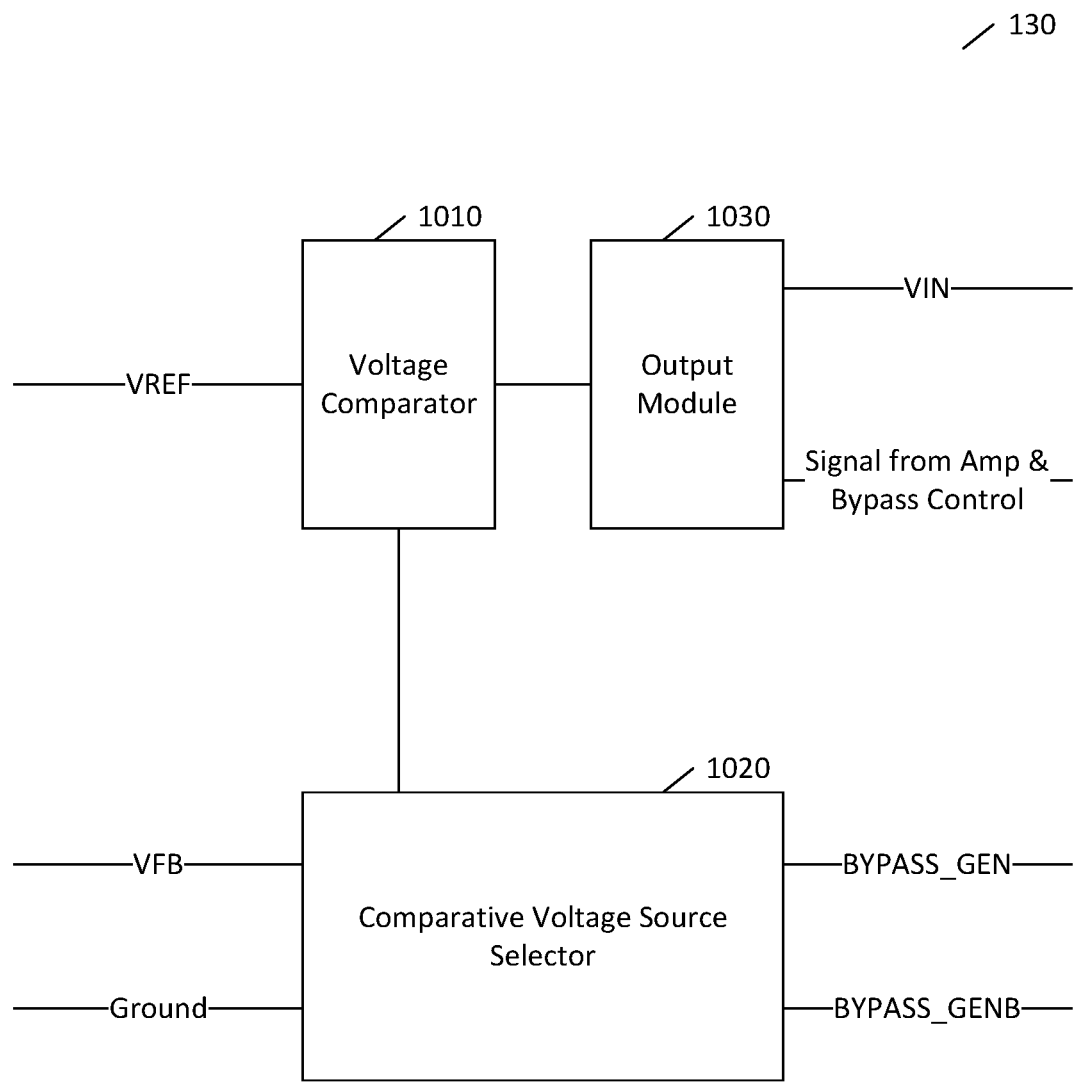
FIG. 10 illustrates an amp and bypass control module according to certain embodiments of the present invention.

FIG. 10 illustrates an amp and bypass control module according to certain embodiments of the present invention. As shown in FIG. 10, the amp and bypass control module 130 can include a voltage comparator 1010, a comparative voltage source selector 1020, and an output module 1030. The voltage comparator 1010 can compare a reference voltage VREF, which can be unrelated to the other reference voltages described herein, with a comparative value provided by the comparative voltage source selector 1020. The comparative voltage source selector 1020 can include switches or other mechanisms used to select between a feedback voltage VFB and ground. The switches or other mechanisms can be controlled by, for example, logical signals BYPASS_GEN and BYPASS_GENB, which can be inputs to the comparative voltage source selector 1020.

The schemes or systems shown in FIGS. 1 through 10 can sense output voltage to address short-circuit scenarios in both a low drop-out mode of operation and a bypass mode of operation. The current during a short circuit can be kept below a maximum load current without impacting loop stability.

Certain embodiments of the present invention can relate to a system. The system can include a first power transistor configured to operate in a low drop-out mode. This may, for example, correspond to the power transistor illustrated in FIG. 6 or FIG. 7. The system can also include a short to ground sensor configured to control current to the first power transistor. This may be implemented, for example, by the short to ground sensor 140 illustrated in FIGS. 1 through 4. The short to ground sensor 140 can be configured to limit a maximum short-circuit current below a predefined load current capability. The predefined load current capability may be a rating of the device or of a component of the device.

The system can also include a first diode clamp connected to a gate of the power transistor. This may correspond to diode clamp 610 show by way of example in FIGS. 6 and 9, or specifically the clamp formed by transistor 910 in FIG. 9. The short to ground sensor can be configured to affect the behavior or operation of the first diode clamp.

The short to ground sensor can be configured to affect the behavior or operation of the first diode clamp by selectively switching the use of the first diode clamp. This may be implemented, for example, using SW1 in FIG. 9.

The system can also include a second diode clamp connected in series with the first diode clamp. For example, as shown in FIG. 9, transistor 920 can be connected in series with transistor 910.

The system can additionally include a second power transistor configured to operate in a bypass mode, such as the transistor illustrated in FIG. 7 or FIG. 8. The short to ground sensor 140 can be configured to control operation of the second power transistor.

The system can further include a bypass controller configured to control operation of the first power transistor. This may be implemented using an amp and bypass control module 130, as shown in FIGS. 1, 3, and 10, or a similar device. The short to ground sensor 140 can be configured to control use of the bypass controller. For example, the short to ground sensor 140 can control use of the bypass controller by controlling the position of the internal switches of the bypass controller using optional signals BYPASS_GEN and BYPASS_GENB, as shown in FIGS. 3, 4, and 10.

As mentioned above, the short to ground sensor 140 can be configured to operate based on a voltage sensing mechanism. This may be in contrast to sensors configured to operate on a current sensing scheme.

This system, or similar systems with modifications, can be configured to perform one or more related methods. Such a method can include operating a first power transistor in a low drop-out mode. The method can also include controlling, with a short to ground sensor 140, current to the first power transistor. The controlling can limit a maximum short-circuit current below a predefined load current capability.

The controlling can include comparing an reference voltage to a feedback voltage combined with a gate voltage of a measurement transistor. When the comparison yields a result that the reference voltage is greater, the controlling can include limiting current using a first diode clamp. By contrast, when the comparison yields a result that the reference voltage is less, the controlling can include limiting current using a plurality of diode clamps. The controlling can include limiting current to a selected one of two different current levels, as described above. The controlling can include selectively switching the use of at least one of the diode clamps.

Certain embodiments may have various benefits and advantages. The above voltage sensing can be used in a variety of circuits, such as in a sensor for automotive applications or any other desired application in any field of use. Moreover, certain embodiments of the present invention can be used specifically as a voltage sensing mechanism, as distinct from a current sensing mechanism.

Additionally, in certain embodiments of the present invention the load current during a short-to-ground condition can be made lower than the maximum active load current. This may be useful when there is higher drop-out across the LDOs designed for higher load currents and there is a desire to minimize power-dissipation during a short to ground.

Also, certain embodiments of the present invention can save from overload conditions a bypass mode power-FET whose gate is in full-swing level, for example controlled by digital logic. Likewise, certain embodiments of the present invention can save from overload conditions a bypass mode power-FET whose gate is not in full-swing level, for example controlled by a feedback loop.

Certain embodiments may have multiple (e.g., two or more) distinct current limit thresholds, one for normal operation and one for a short to ground condition. Additionally, certain embodiments can be digitally implemented. The digital implementation may help improve stability and may be usable in a bypass mode. Moreover, certain embodiments may be advantageous when $I_{load}$ is close to $I_{max}$. For example, power dissipation ($P_{dissipation}$) may be less.

One having ordinary skill in the art will readily understand that the invention as discussed above may be practiced with steps in a different order, and/or with hardware elements in configurations which are different than those which are disclosed. Therefore, although the invention has been described based upon the embodiments disclosed herein, it would be apparent to those of skill in the art that certain modifications, variations, and alternative constructions would be apparent, while remaining within the spirit and scope of the invention, as claimed.

We claim:

1. An apparatus, comprising: a first power transistor; a second power transistor, wherein the second power transistor is in parallel with the first power transistor; and a short to ground sensor configured to control current to the first power transistor and to the second power transistor, wherein the short to ground sensor is configured to limit a maximum short-circuit current below a predefined load current capability of a load coupled to an output of the first power transistor and to an output of the second power transistor, wherein the short to ground sensor comprises a voltage comparator to compare a reference voltage to a feedback voltage; a first diode clamp having an output coupled to a gate of the first power transistor; wherein the short to ground sensor further comprises logic circuitry having an output coupled to an input of the first diode clamp, wherein the first power transistor is configured by the first diode clamp to operate in a low-drop out mode when the comparison yields a result that the reference voltage is greater than the feedback voltage and the first power transistor is configured by the first diode clamp to operate in a bypass mode when the comparison yields a result that the reference voltage is less than the feedback voltage, and wherein the second power transistor is configured by the short to ground sensor to operate in the bypass mode, wherein the low drop-out mode provides regulation of a voltage source provided to the load and the bypass mode does not provide regulation of the voltage source, such that in the bypass mode the voltage source is applied to the load without additional regulation of the voltage source; and wherein current flows through both the first power transistor and the second power transistor in parallel when the first power transistor and the second power transistor are configured to operate in the bypass mode.

2. The apparatus of claim 1, wherein the short to ground sensor is configured to affect the operation of the first diode clamp by selectively switching between use and non-use of the first diode clamp.

3. The apparatus of claim 1, wherein the apparatus comprises a second diode clamp connected in series with the first diode clamp.

4. The apparatus of claim 3, wherein, when the comparison yields the result that the reference voltage is greater than the feedback voltage, the short to ground sensor is further configured to limit the maximum short-circuit current using the second diode clamp; and wherein, when the comparison yields a result that the reference voltage is less than the feedback voltage, the short to ground sensor is further configured to limit the maximum short-circuit current using the first and second diode clamps.

5. The apparatus of claim 1, further comprising:
a bypass controller configured to control operation of the first power transistor, wherein the short to ground sensor is configured to control use of the bypass controller.

6. The apparatus of claim 1, wherein the short to ground sensor is configured to operate based on a voltage sensing mechanism measuring a voltage output at the first power transistor and the second power transistor.

7. A method, comprising: operating a first power transistor in a low drop-out mode or in a bypass mode; operating a second power transistor in the bypass mode, wherein the second power transistor is in parallel with the first power transistor; and controlling, with a short to ground sensor, current to the first power transistor and to the second power transistor, wherein the controlling limits a maximum short-circuit current below a predefined load current capability of a load coupled to an output of the first power transistor and to an output of the second power transistor; wherein the controlling compares a reference voltage to a feedback voltage, with a voltage comparator, and wherein a first diode clamp having an input coupled to an output of logic circuitry of the short to ground sensor and an output coupled to a gate of the first power transistor configures the first power transistor to operate in the low drop-out mode when the comparison yields a result that the reference voltage is greater than the feedback voltage and the first diode clamp further configures the first power transistor to operate in the bypass mode when the comparison yields a result that the reference voltage is less than the feedback voltage and the short to ground sensor configures the second power transistor to operate in the bypass mode, wherein the low drop-out mode provides regulation of a voltage source provided to the load and the bypass mode does not provide regulation of the voltage source; such that in the bypass mode the voltage source is applied to the load without additional regulation of the voltage source; and wherein current flows through both the first power transistor and the second power transistor in parallel when the first power transistor and the second power transistor are configured to operate in the bypass mode.

8. The method of claim 7, wherein the controlling operates based on a voltage sensing mechanism measuring a voltage output at the first power transistor and the second power transistor.

9. The method of claim 7, wherein when the comparison yields a result that the reference voltage is greater than the feedback voltage, the controlling comprises limiting current using a second diode clamp.

10. The method of claim 7, wherein when the comparison yields a result that the reference voltage is less than the feedback voltage, the controlling comprises limiting current using the first diode clamp and a second diode clamp connected in series with the first diode clamp.

11. The method of claim 10, wherein the controlling comprises selectively switching between use and non-use of at least one of the first diode clamp and the second diode clamp.

12. The method of claim 7, wherein the controlling comprises limiting the current to a selected one of two different current levels.

13. An apparatus, comprising:
means for operating a first power transistor;
means for operating a second power transistor, wherein the second power transistor is in parallel with the first power transistor; and
means for controlling, with a short to ground sensor, current to the first power transistor and to the second power transistor, wherein the controlling limits a maximum short-circuit current below a predefined load current capability of a load coupled to an output of the first power transistor and to an output of the second power transistor;
wherein the means for controlling compares, with a voltage comparator, a reference voltage to a feedback voltage and configures, with a first diode clamp coupled to an output of logic circuitry of the short to ground sensor and to a gate of the first power transistor, wherein the first diode clamp configures the first power transistor to operate in a low drop-out mode when the comparison yields a result that the reference voltage is greater than the feedback voltage and the first diode clamp configures the first power transistor to operate in the bypass mode when the comparison yields a result that the reference voltage is less than the feedback voltage and the short to ground sensor configures the second power transistor to operate in the bypass mode, wherein the low drop-out mode provides regulation of a voltage source provided to the load and the bypass mode does not provide regulation of the voltage source, such that in the bypass mode the voltage source is applied to the load without additional regulation of the voltage source; and
wherein current flows through both the first power transistor and the second power transistor in parallel when the first power transistor and the second power transistor are configured to operate in the bypass mode.

14. The apparatus of claim 13, wherein the means for controlling comprises limiting the maximum short-circuit current to a selected one of two different current levels.

15. The apparatus of claim 13, wherein when the comparison yields the result that the reference voltage is greater than the feedback voltage, the means for controlling comprises means for limiting current to a first level.

16. The apparatus of claim 13, wherein when the comparison yields the result that the reference voltage is less than the feedback voltage, the means for controlling comprises means for limiting current to a second level different from a first level.

17. The apparatus of claim 13, wherein the controlling limits the maximum short-circuit current below the predefined load current capability using the first diode clamp, and wherein the means for controlling comprises means for selectively switching between use and non-use of the first diode clamp.

18. The apparatus of claim 13, wherein the means for controlling comprises means for limiting the maximum short-circuit current to a selected one of two different current levels.

* * * * *